May 3, 1966     E. L. BREVIK     3,249,478
PROCESS FOR PRODUCING A BIMETALLIC STRUCTURE BY ETCHING
Filed July 26, 1961     2 Sheets-Sheet 1
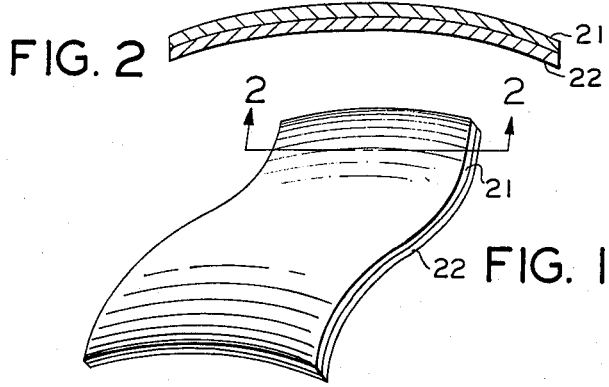
FIG. 2
FIG. 1
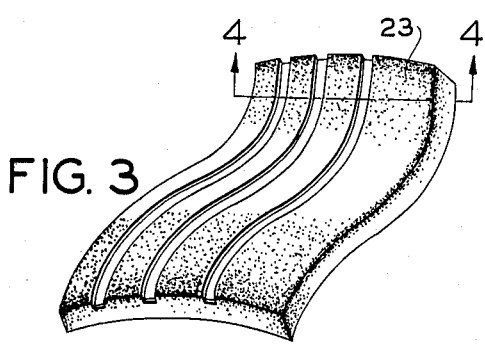
FIG. 3
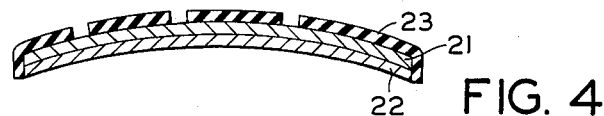
FIG. 4
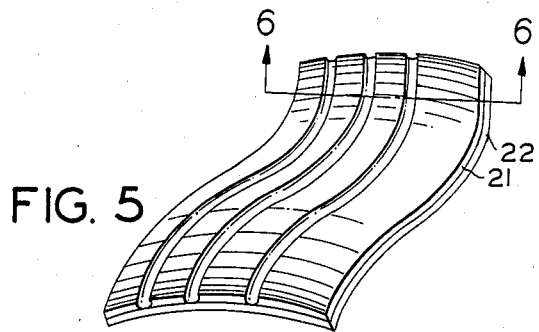
FIG. 5
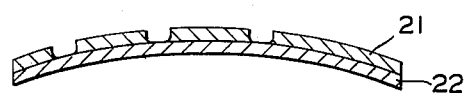
FIG. 6
*INVENTOR.*
ELMER LAWRENCE BREVIK

INVENTOR.
ELMER LAWRENCE BREVIK

_United States Patent Office_

3,249,478
Patented May 3, 1966

3,249,478
PROCESS FOR PRODUCING A BIMETALLIC STRUCTURE BY ETCHING
Elmer Lawrence Brevik, Los Angeles, Calif., assignor to Chemical Milling International Corporation, El Segundo, Calif., a corporation of California
Filed July 26, 1961, Ser. No. 127,017
4 Claims. (Cl. 156—3)

This invention relates to a new and novel bimetallic structure useful in the field of rocket and aircraft structures as well as other fields wherein high strength to weight ratios are essential to the high performance requirement demands for modern structural materials. I have found that structures with very desirable and unique characteristics can be produced from bimetallic metals, by which I mean sheet stock or plate which is composed of two distinct layers of different metals or alloys which have been selected for their individual properties and which are bonded to each other by a metallurgical bond usually produced during a rolling operation in which two billets of the dissimilar metals have been joined by welding and subsequently reduced by rolling under pressure in the familiar metal rolling mills; or by one sheet of alloy or metal bonded to the other by a mutually compatible brazing alloy which has insignificant thickness in the bimetallic sheet as compared to either of the two sheets which it bonds; or by any other method which will produce a metallurgical bond between the two metals or alloys of which the sheet is composed but which, according to my definition, does not include relatively thin coatings produced by plating one metal or alloy on the substrate which is the major part of the finished structure and which coating in itself is employed for a purpose other than for structural purposes such as bearing a load or containing pressure and the like, nor do I include any metals or materials which are joined by adhesives of the organic or plastic type nor those joined by inorganic materials such as water-glass or other inorganic material which is not classed as a metal or alloy.

The structures of which I speak, are, therefore, materials which are produced as flat plates which are subsequently formed into complex structures with either simple or compound curvatures or into angles which are either right, acute or obtuse as distinguished from parts produced and utilized in the form of flat sheets. The gist of my invention is the forming of the bimetallic structure into the complex form in which it is ultimately utilizable so that one face of the bimetallic structure with the one metal of the structure with the desirable properties for which it is selected is contoured or formed to the desired shape and subsequently etching away a preselected portion of the other metal so as to form land areas of the second metal metallurgically attached to the first metal without further riveting, welding or bonding of the second metal to the first. It is quite apparent that such a structure will have great advantages over the past methods of construction wherein the parts were of necessity formed as individual components and subsequently matched to produce a unitized structure by welding, bonding, riveting or bolting.

In the past it has been the practice in many areas of construction to utilize two different alloys or metals in an assembly to obtain certain desirable characteristics of each as for instance in the fabrication of vessels wherein the corrosion resistance of austinitic stainless steels are used to advantage but the structure requires greater strength than that afforded by the austinitic stainless steels within economic limitations so that structure is provided on the exterior of the vessel not exposed to the corrosive atmosphere with high strength heat-treatable steels. In aircraft, where weight is of primary concern, thin aluminum skins are satisfactory for the exterior skin but such skins must be attached to high strength substructure of a different metal or alloy than that of the skin; in heat exchange equipment where it is essential that a corrosion resistant alloy be employed on the side exposed to corrosive media but the other side of the exchanger is exposed to a different media which is not extremely corrosive, it is advantageous to employ as thin a corrosion resistant metal or alloy as possible and utilize a metal such as copper, silver or aluminum on the side exposed to the noncorrosive media so that the highly heat-conductive metal or alloy provides both additional strength and improved heat transfer. There are numerous other structures of the type indicated wherein two different metals or alloys may be employed to obtain the advantage of the peculiar properties of each.

It is the object of my invention to provide a bimetallic structure or article which is formed from a single sheet of bimetallic material and subsequently remove a part of one of the metals or alloys to produce a structure or part of light weight wherein the metal or alloy from which no part has been removed forms a surface, skin or barrier for the ultimate structure and the metal or alloy from which a part has been removed is a high strength metal or alloy which provides the necessary structural strength for the final assembly. It is a further object of my invention to provide a bimetallic structure in which a high-strength alloy is metallurgically bonded to a lower strength alloy or metal in sheet or plate form, subsequently forming an object from the plate, subsequently thereafter masking the formed object with a resist which is not attacked by an etching composition, removing a portion of the resist in a predetermined pattern on one side of the bimetallic structure, which side is that of the high strength metal or alloy, exposing the masked sheet to a chemical etching composition which is reasonably corrosive to the high strength metal or alloy and thereby etching away the metal or alloy exposed to the solution but stopping the etching action when the second low strength metal or alloy is exposed to the etching solution and thereby producing a structure of predetermined configuration having a predetermined design of high strength metal or alloy metallurgically bonded to a skin of low-strength metal or alloy. It is yet another object of my invention to provide a high heat transfer metallic structure in which a bimetallic plate or tube or formed structure in which one of the metals or alloys is a relatively low heat transfer metal or alloy and the second metal or alloy is a relatively high heat transfer metal or alloy such that the heat passing through the first or relatively low transfer alloy to the second or high transfer alloy such that the second alloy will provide paths for the flow of heat and subsequent disposition of the heat into another body or heat transfer medium.

It is still a further object of my invention to provide a bimetallic structure composed of two metals or alloys which are of substantially different melting points such that at normal atmospheric temperature or relatively low temperatures, both metals or alloys will provide structural strength to the article or structure of my invention but at a predetermined point, the metal or alloy comprising the etched portion of my bimetallic structure will melt or be oxidized away leaving only the other higher melting metal or alloy as the mechanical structure.

It is still a further object of my invention to provide a structure or article consisting of one very high heat transfer metal or alloy, and generally of significantly better heat transfer quality than the other of the bimetallic metals, etching away a portion of the surface of the high heat transfer metal or alloy such that the second metal is exposed in part and thereby greatly increasing the surface area of the high heat transfer metal or alloy so that the rate of transfer of heat into the medium adjacent to the high heat transfer metal or alloy will be enhanced.

In the past, it has been the practice to employ bimetallic metals only for specific purposes such as corrosion protection wherein an entire plate or sheet of the bimetallic metal was welded into a vessel or the like in such a manner that one of the metals was exposd to the corrosive atmosphere, this metal being the more corrosion resistant of the two metals and the second metal was employed for the purpose of adding structural strength to the vessel.

Another application was in heat exchanger tubes in which the bimetals generally consisted of one metal which was resistant to a corrosive atmosphere and the second metal was selected because of its high heat transfer rate but no attempt was made in either instance to form a structure wherein a part of the metal or alloy of one of the metals was removed for the purpose of providing a bimetallic structure of high strength which was much lighter in weight than the structure as produced from the sheet or plate.

It has very frequently been the practice to use two different metals or alloys in specific structures in which one metal or alloy was selected for purpose of heat resistance or corrosion resistance or for some other purpose and the second metal or alloy was selected to provide the necessary structural strength. Such structures are very frequently found in aircraft structures, aero space vehicles or aquatic vehicles. It has been the practice to create a structure from such two metals or alloys by forming each separately, fitting the separate parts together and subsequently welding the structure to form a unitized article or structure or by such other method as riveting, bolting, brazing or other method.

The disadvantage of the prior methods of construction are apparent when considerd in the light of my invention. In the first instance, the great additional weight required for the vessel in many instances prohibited the use of bimetallic structure and it was necessary to construct the entire structure from a metal which offered both the necessary corrosion resistance as well as the required strength; in most instances this resulted in a great increase in the cost of the ultimate structure. In case attempts were made to fabricate the structure from two parts formed and subsequently attached together to provide the ultimate structure, it was necessary to use extreme care in forming so that the two parts mated in a manner which would permit the joining of the two sub-assemblies into an integral finished part. This method of fabrication required the forming of two sub-assemblies rather than one and also introduced additional requirements in the permissable tolerance if rigid specifications were to be met. By the method of this invention it is necessary to form only one part, this being the master part into the desired configuration and subsequently removing the unnecessary part of the structure to provide the necessary strength and weight. Almost any shape can be formed by this method whereas by the prior methods, it was often necessary to limit the degree of forming so that the two surfaces could be mated with each other.

The objects and advantages of my invention will be more clearly understood by reference to the drawings which sequentially represent the steps necessary for the production of one type of article of my invention and which are described as follows:

FIG. 1 is a representation of a formed sheet of bimetallic material representative of the type employed in this invention.

FIG. 2 is a cross-sectional view through section 2—2 of FIG. 1 showing the bimetallic structure.

FIG. 3 is the formed article of FIG. 2 which has been coated with a resist on one side in preselected areas.

FIG. 4 is a cross-section 4—4 of FIG. 3 showing the resist layer intact upon one face of the bimetallic structure.

FIG. 5 shows the finished bimetallic structure after etching away a portion of one of the metals in the preselected pattern.

FIG. 6 is a cross-section 6—6 of FIG. 5.

Figure 7:
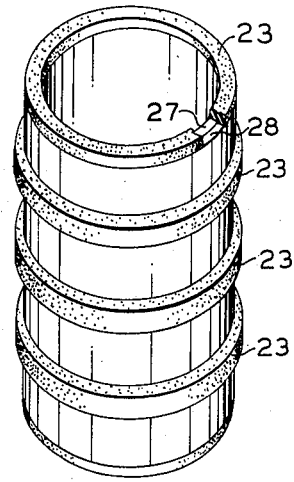
FIG. 7 is a cylindrical object of bimetal construction coated with resist in a prescribed design.

The following description of the figures will clearly define the process and resultant articles of my invention:

FIG. 1 is a representation of a formed object having compounded curvatures and consisting of alloy 21 and a different alloy 22.

FIG. 2 is a cross-section through FIG. 1 showing the relative positions of the two alloys 21 and 22. The metallurgical bond between 21 and 22 is represented only as the lines between the two metals as, generally speaking, the bond has no significant thickness and therefore no thickness dimension. However, by this representation I do not mean to exclude such metallurgical bonds as would be developed by the welding of the two metals prior to rolling which would produce a bonded area of significant thickness consisting not only of the weld metal but also of an area adjacent to the weld commonly termed the transition area which consists of an area of metallurgical gradation of a composition varying from the weld metal alloy to the parent metal alloy in all proportions.

FIG. 3 represents the object of FIG. 1 which has been coated, in part, with a resist 23. The resist is applied either as a liquid which is subsequently hardened or cured by solvent evaporation, catalysis, or other methods generally known in the art; or as a tape or sheet which is bonded to the metallic structure by means of an adhesive.

FIG. 4 is a cross-section of FIG. 3 showing the relative positions of the bimetallic structure composed of alloys 21 and 22 covered in part by resist 23. The resist pattern which has been determined to produce an ultimate predetermined structure covers only portions of metal 21 leaving exposed certain other portions as well as leaving exposed the entire surface of the metal 22. The object of FIG. 3 is then exposed to an etching solution which will attack and etch away the metal 21 in the exposed areas but will not attack the metal 21 which has been protected by resist 23 and which etchant solution is non-corrosive to metal 22.

FIGS. 5 and 6 show the bimetallic structure of FIG. 1 which had been covered with the resist as shown in FIG. 3, exposed to the etching solution for a period of time sufficient for the exposed areas of FIG. 3 to have been completely etched away in metal 21 to a depth equivalent to the thickness of metal 21 and exposing the metallurgically bonded surface of metal 22 in the areas in which the etchant penetrated through the metal 21.

Figure 8:
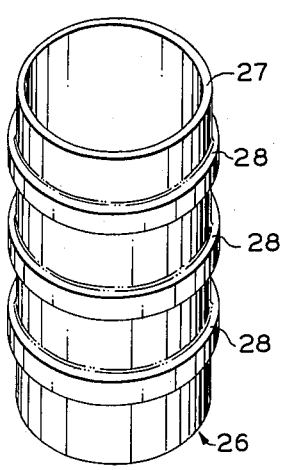
FIG. 8 is a representation of the object of FIG. 7 which has been etched and the resist removed.

FIG. 7 represents a cylindrical object consisting of a metal in the interior of the cylinder 27, and an exterior metal 28, which two metals are metallurgically bonded to each other and which cylindrical object has been coated with a resist 23 in a predetermined pattern. When the object of FIG. 7 is exposed to an etching solution which is corrosive to the metal 28 but non-corrosive to the metal 27 and etched for a period of time sufficient for the corrosive action of the chemical etching solution to completely dissolve the metal 28 in the exposed areas but not attack the metal 28 protected by the resist 23 and subsequently removing the resist thereby producing the object of FIG. 8, a cylindrical object being much lighter in weight than the object of FIG. 7 prior to etching but having very high strength as a result of the metallurgically bonded bands of metal 28.

Figure 9:
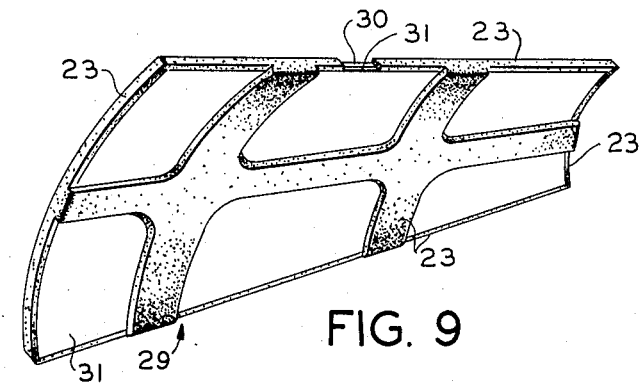
FIG. 9 is a bimetallic structure having compound curvature which has been coated with a resist in a prescribed pattern.
Figure 11:
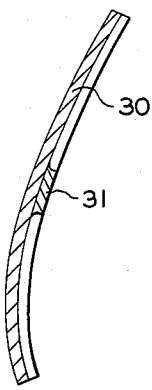
FIG. 11 is a cross-section of FIG. 10 showing the relative position of the two metals of the final structure.
Figure 10:
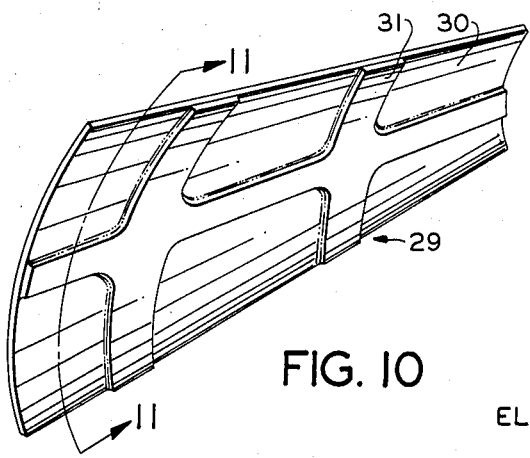
FIG. 10 is a view of the object of FIG. 9 which has been etched and the resist removed.

FIG. 9 is a representation of a bimetallic object 29, composed of metallurgically bonded metals 30 and 31, and which object has been covered in part with a resist 23, thereby covering certain portions of the metal 31 in a predetermined pattern and leaving certain other areas of the metal 31 uncoated with resist. The resist coated bimetallic structure 29 is then, according to my invention, exposed to an etching solution which is corrosive to the metal 31 in areas not covered by resist 23 but which is noncorrosive or relatively noncorrosive to the metal 30. After etching away the metal 31 in the areas exposed to the etchant and removing the resist 23 a resulting structure represented by FIG. 10 and the cross-section of FIG. 11, having structural lands of metal 31 metallurgically bonded to the integral sheet of metal 30.

It is apparent to those skilled in the art that as the etching proceeds in the areas not protected by the resist that an area of metal is exposed which is normal to the plane of the resist and ultimately forms the edge of the land area of the metal etched. As this area is exposed to the etchant, it tends to be attacked and thereby undercut the resist. In the normal etching operation, etching will proceed under the resist to a depth approximately equivalent to the thickness of the metal which has been etched. Therefore, the land produced by etching is somewhat less in width than the width of the resist; this factor is taken into consideration in designing the bimetallic object to insure that sufficient width of land area remains to provide the necessary structural strength for the finished object. It is further apparent to those skilled in the art that as the metal being etched is completely removed in the exposed areas not covered by the resist, thereby exposing the second metal or alloy, the object should be removed from the etching bath or etching will continue underneath the edges of the resist thereby reducing the land areas in width. In some instances, however, it may be a desirable feature to continue etching for a predetermined period of time to reduce the land areas to the desired configuration or width.

In the foregoing discussion, reference has been made to a bimetallic structure without specifically naming metals or alloys involved in such structure. The technology of metallurgically bonding two different metals to form a bimetallic structure in sheet or plate or extruded form has advanced to the stage where the possible combinations are almost limitless. As the gist of my invention is the manufacture of a bimetallic article wherein one of the metals is entirely removed in certain preselected areas, the advance in the art which I have invented is applicable to all such structures. Therefore, by way of explanation rather than limitation I cite the following examples:

*Example 1*

A sheet of bimetallic metal consisting of copper and stainless steel, the stainless steel consisting essentially of 18% chromium, 8% nickel, balance iron, having a total thickness of approximately 0.120 inch of which about 0.060 inch consisted of copper and the remainder stainless steel, was coated on the copper side with a neoprene rubber resist which was applied from a toluene solution by brushing; subsequently an area of the resist was removed in a predetermined pattern and the resist coated bimetallic structure was exposed to a solution of 20% nitric acid. The stainless steel was not attacked by this etching solution but the area of copper not protected by the resist was completely dissolved away until the stainless steel was exposed, at which time the bimetallic structure was removed from the etching bath, the resist was completely removed from the remaining copper and the resultant object was a bimetallic structure of reduced weight equivalent to the amount of copper metal removed by the etching operation.

*Example 2*

A sheet of bimetallic material composed of metallurgically bonded 1010 carbon steel of a composition of about 0.100 carbon, the remainder being essentially iron together with other minor alloy elements, of approximately .120 thickness and the other alloy being approximately 0.040 inch thickness of stainless steel of essentially the same composition of Example 1, was formed into a compound curvature. The carbon steel was then partially coated with strips of 1 inch wide butyl rubber which had been prepared on one side with an adhesive of neoprene rubber. The strips of butyl rubber resist were approximately one inch in width and extended entirely across the surface of the carbon steel and were placed approximately one inch apart. The bimetallic structure was then exposed to a 30% solution of nitric acid for a sufficient length of time to completely etch away the carbon steel in the exposed areas. When it was observed that the stainless steel was exposed in the areas not protected by the resist, the object was removed from the etching bath and the tape resist was removed. The resulting object was a bimetallic structure of compound curvature consisting of a sheet of stainless steel having metallurgically bonded ribs of carbon steel of approximately 0.760 inch in width running parallel to each other across the entire sheet and separated from each other by approximately 1.240 inches. The resulting object was found to possess excellent rigidity when force was applied in a direction parallel to the carbon steel ribs and which weighed approximately 40% less than the original bimetallic object.

*Example 3*

A piece of 4-inch square x 0.150 thick 1020 steel having a composition of essentially iron and 0.20% carbon together with minor other alloy constituents was coated by welding with Hastelloy alloy D, a proprietary composition of the Haynes-Stellite Company having a nominal composition of approximately 61% nickel, 2.5% cobalt, 1% chromium, 28% molybdenum, 5.5% iron, 1.0% silicon, 1.0% manganese, and other minor alloying constituents to a thickness in excess of 0.20 inch; the weld area was then ground to a nominal thickness of 0.020 inch. The carbon steel was then coated as described in Example 1 in a predetermined pattern. The bimetallic structure was then etched in an aqueous compound consisting of approximately 4 normal chloride ion, 3 normal nitrate ion, 3 normal hydronium ion, with the necessary quantity of iron ion necessary to make the electroneutral chemical composition until the carbon steel was completely removed in the exposed areas. An object was formed having a rigid frame of carbon steel metallurgically bonded to the Hastelloy alloy D but being substantially less in weight than the original structure.

Numerous additional examples could be cited in which two metals or alloys metallurgically bonded together to form a bimetallic structure were prepared with a resist as described above and subsequently etched with a chemical solution which was corrosive to one of the metals or alloys and not corrosive to the other. I wish to point out, however, that this is not a necessary prerequisite of my invention. For instance, the carbon steel-stainless steel bimetallic structure described in Example 2 could be etched in a solution of aqua regia, which composition is a well known composition of nitric-hydrochloric acid, if the resist were properly applied. In other words, as the aqua regia will etch both the carbon steel and the stainless steel, it will be necessary to protect the stainless steel exposed to the chemical etching bath. This is accomplished by applying a resist entirely over the exposed surface of stainless steel and subsequently etching the predescribed pattern in the carbon steel to a depth equivalent only to the thickness of the carbon steel, thereby produc- Therefore, for my invention, I claim the following:

1. The method for production of metallurgically-bonded bimetallic structure "consisting of a sheet of higher strength alloy metallurgically bonded to a sheet of lower strength alloy"; having a predetermined design in the higher strength metal or alloy of the bimetallic structure consisting of coating a piece of bimetallic metal with a resist in a predetermined pattern on the higher strength metal or alloy, exposing the partially resist-coated bimetallic piece to a chemical solution capable of dissolving the higher strength metal or metallic alloy exposed to the chemical solution, etching the exposed metal for a period of time sufficient for the metal in the areas defined by the pre-selected design of the resist coated areas to be entirely etched away exposing the lower strength metal of the bimetallic structure, removing the bimetallic structure from the chemical etching solution, and removing the resist.

2. The method of claim 1 wherein the bimetallic structure is a preformed structure having a compound curvature.

3. The method of claim 1 in which the higher strength alloy has relatively poor heat transfer properties.

4. The method of claim 1 in which the higher strength alloy has a lower melting point than the lower strength alloy.

References Cited by the Examiner

UNITED STATES PATENTS

| 2,289,311 | 7/1942 | Wellman | 29—196.3 X |
| 2,584,317 | 2/1952 | Aller. | |
| 2,739,047 | 3/1956 | Sanz. | |
| 2,940,838 | 6/1960 | Snyder | 156—12 |

FOREIGN PATENTS 622,236   4/1949   Great Britain.

ALEXANDER WYMAN, *Primary Examiner.*

JACOB STEINBERG, EARL M. BERGERT, *Examiners.*